(12) United States Patent
Suzuki et al.

(10) Patent No.: US 10,325,630 B2
(45) Date of Patent: Jun. 18, 2019

(54) ELECTRONIC DEVICE CAPABLE OF OPERATING ON DEMONSTRATION MODE AND NORMAL MODE

(71) Applicant: Onkyo Corporation, Neyagawa-shi (JP)

(72) Inventors: Takahiro Suzuki, Neyagawa (JP); Taiki Fujii, Osaka (JP)

(73) Assignee: ONKYO CORPORATION, Osaka (JP)

( * ) Notice: Subject to any disclaimer, the term of this patent is extended or adjusted under 35 U.S.C. 154(b) by 0 days.

(21) Appl. No.: 15/914,908

(22) Filed: Mar. 7, 2018

(65) Prior Publication Data

US 2018/0261257 A1    Sep. 13, 2018

(30) Foreign Application Priority Data

Mar. 7, 2017   (JP) ................................ 2017-042802

(51) Int. Cl.
| | |
|---|---|
| G11B 31/02 | (2006.01) |
| H02J 7/00 | (2006.01) |
| H01M 10/44 | (2006.01) |
| H01M 10/42 | (2006.01) |
| G06Q 30/02 | (2012.01) |

(Continued)

(52) U.S. Cl.
CPC ............ *G11B 31/02* (2013.01); *G06Q 30/02* (2013.01); *G09G 5/00* (2013.01); *H01M 10/425* (2013.01); *H01M 10/44* (2013.01); *H02J 7/0003* (2013.01); *H02J 7/0052* (2013.01); *H02J 7/0068* (2013.01);

(Continued)

(58) Field of Classification Search
None
See application file for complete search history.

(56) References Cited

U.S. PATENT DOCUMENTS

| | | | |
|---|---|---|---|
| 5,550,985 A * | 8/1996 | Miller | ........................ G06F 1/26 358/1.1 |
| 8,676,656 B2 * | 3/2014 | Ebrom | ................... G06Q 30/02 434/365 |

(Continued)

FOREIGN PATENT DOCUMENTS

| | | |
|---|---|---|
| JP | 2005-342301 A | 12/2005 |
| JP | 2011-45780 A | 3/2011 |

OTHER PUBLICATIONS

Search Report and Office Action issued in European Application 18158489.7-1210 dated Jul. 6, 2018.

*Primary Examiner* — Tan X Dinh
(74) *Attorney, Agent, or Firm* — Xsensus LLP (57) ABSTRACT

An electronic device that includes an external storage medium connection unit to which an external storage medium is connected; a detection unit that detects whether or not demonstration data is stored in the external storage medium connected to the external storage medium connection unit; and an operation mode control unit that causes the device to operate in a demonstration mode in a case where the demonstration data is stored in the external storage medium connected to the external storage medium connection unit, and causes the device to operate in a normal mode in a case where the external storage medium is not connected to the external storage medium connection unit and no demonstration data is stored in the external storage medium connected to the external storage medium connection unit.

14 Claims, 3 Drawing Sheets

(51) Int. Cl.
*G09G 5/00* (2006.01)
*H04N 1/21* (2006.01)
(52) U.S. Cl.
CPC ..... *H04N 1/2158* (2013.01); *G09G 2330/022* (2013.01)

(56) References Cited

U.S. PATENT DOCUMENTS

| | | | | |
|---|---|---|---|---|
| 8,682,735 | B2* | 3/2014 | Ebrom | D06F 33/02 434/365 |
| 8,688,530 | B2* | 4/2014 | Ebrom | D06F 33/02 434/365 |
| 9,535,412 | B2* | 1/2017 | Arrigoni | G05B 19/042 |
| 9,898,169 | B2* | 2/2018 | Brasseur | G06F 8/65 |
| 2003/0011807 | A1 | 1/2003 | Montierth et al. | |
| 2007/0165277 | A1* | 7/2007 | Montierth | G06K 15/00 358/1.15 |
| 2007/0298405 | A1* | 12/2007 | Ebrom | G09B 25/00 434/365 |
| 2008/0100695 | A1* | 5/2008 | Ebrom | D06F 33/02 348/14.08 |

* cited by examiner

ELECTRONIC DEVICE CAPABLE OF OPERATING ON DEMONSTRATION MODE AND NORMAL MODE

CROSS-REFERENCE TO RELATED APPLICATIONS

This application claims priority to Japanese Application No. 2017-042802, filed Mar. 7, 2017, the entire contents of which are incorporated herein by reference.

FIELD

The present disclosure relates to an electronic device, a method, a program, and a computer-readable recording medium. Specifically, the present disclosure relates to an electronic device operable in a demonstration mode, a method, a program, and a computer-readable recording medium.

BACKGROUND

Typically, an electronic device has been known, which is operable in a demonstration mode as an operation mode for advertising operation to a customer etc. or attracting customer's interest at an exhibition location such as a store. In the demonstration mode, operation different from that of a normal mode as an operation mode upon normal use of the electronic device by a user is generally performed. For example, in the demonstration mode, video or audio for demonstration can be output. Alternatively, as compared to the normal mode, some of settings of the electronic device are fixed, or some of functions of the electronic device are restricted.

For example, JP-A-2005-342301 describes that focusing on a difference in a hardware configuration of a dish washing and drying device, normal operation is performed in a case where an EEPROM is mounted on the dish washing and drying device, and demonstration operation is performed in a case where no EEPROM is mounted.

SUMMARY

For example, hardware for demonstration and normal (mass-produced) hardware might be shared considering cost reduction. In this case, the software mounted (installed) on the electronic device needs to determine whether the electronic device operates in the demonstration mode or the normal mode.

As described above, operation is generally different between the demonstration mode and the normal mode. Thus, it is not proper that the electronic device is brought into the demonstration mode upon normal use by the user. On this point, the software only for the demonstration mode and the software only for the normal mode might be separately prepared. However, there is a problem that a development cost increases due to separate preparation of these types of software.

For this reason, it has been demanded that in the electronic device, the demonstration mode is, without a change in the software, i.e., by a single type of software, prevented upon normal use by the user while the demonstration mode can be brought by simple operation at the exhibition location etc.

An objective of the present disclosure is to prevent, in an electronic device switchable between a normal mode and a demonstration mode regardless of a change in software, the demonstration mode upon normal use by a user while the demonstration mode can be brought by simple operation.

The present disclosure is an electronic device including an external storage medium connection unit to which an external storage medium is connected, a detection unit configured to detect whether or not demonstration data is stored in the external storage medium connected to the external storage medium connection unit, and an operation mode control unit configured to cause the device to operate in a demonstration mode in a case where the demonstration data is stored in the external storage medium connected to the external storage medium connection unit and to cause the device to operate in a normal mode in a case where the external storage medium is not connected to the external storage medium connection unit and no demonstration data is stored in the external storage medium connected to the external storage medium connection unit.

Preferably, the detection unit detects, as the demonstration data, data stored in a specific folder in the external storage medium connected to the external storage medium connection unit.

Preferably, the electronic device is an audio player, and the demonstration data is image data.

Preferably, the electronic device further includes an output control unit configured to cause an output unit to output the demonstration data stored in the external storage medium in a case where the device operates in the demonstration mode.

Preferably, the output control unit determines the output form of the demonstration data based on at least part of the data name of the demonstration data.

Preferably, the demonstration data stored in the external storage medium includes multiple pieces of demonstration data, and the output control unit determines the output order of each piece of demonstration data based on at least part of the data name of each piece of demonstration data.

Preferably, the output control unit determines the output time of the demonstration data based on a character extracted from the data name of the demonstration data under a predetermined condition.

Preferably, the output control unit allows output of the demonstration data in a case where the device operates in the demonstration mode and there is no operation for the device for a predetermined time.

Preferably, the electronic device further includes a battery and a charging determination unit configured to determine whether or not the battery is being charged. The operation mode control unit causes the device to operate in the demonstration mode in a case where the demonstration data is stored in the external storage medium connected to the external storage medium connection unit and the charging determination unit determines that the battery is being charged.

Moreover, the present disclosure is a method including the detection step of detecting whether or not demonstration data is stored in an external storage medium connected to an external storage medium connection unit of an electronic device, and the operation mode control step of causing the electronic device to operate in a demonstration mode in a case where the demonstration data is stored in the external storage medium connected to the external storage medium connection unit and causing the electronic device to operate in a normal mode in a case where the external storage medium is not connected to the external storage medium connection unit and no demonstration data is stored in the external storage medium connected to the external storage medium connection unit.

Further, the present disclosure is a program for causing a computer to function as an external storage medium connection unit to which an external storage medium is connected, a detection unit configured to detect whether or not demonstration data is stored in the external storage medium connected to the external storage medium connection unit, and an operation mode control unit configured to cause a device to operate in a demonstration mode in a case where the demonstration data is stored in the external storage medium connected to the external storage medium connection unit and to cause the device to operate in a normal mode in a case where the external storage medium is not connected to the external storage medium connection unit and no demonstration data is stored in the external storage medium connected to the external storage medium connection unit.

In addition, the present disclosure is a computer-readable recording medium recording a program for causing a computer to function as an external storage medium connection unit to which an external storage medium is connected, a detection unit configured to detect whether or not demonstration data is stored in the external storage medium connected to the external storage medium connection unit, and an operation mode control unit configured to cause a device to operate in a demonstration mode in a case where the demonstration data is stored in the external storage medium connected to the external storage medium connection unit and to cause the device to operate in a normal mode in a case where the external storage medium is not connected to the external storage medium connection unit and no demonstration data is stored in the external storage medium connected to the external storage medium connection unit.

According to the present disclosure, in the electronic device switchable between the normal mode and the demonstration mode regardless of a change in software, the demonstration mode is prevented upon normal use by the user while the demonstration mode can be brought by simple operation.

DETAILED DESCRIPTION

Hereinafter, an embodiment of the present disclosure will be described.

Figure 1:
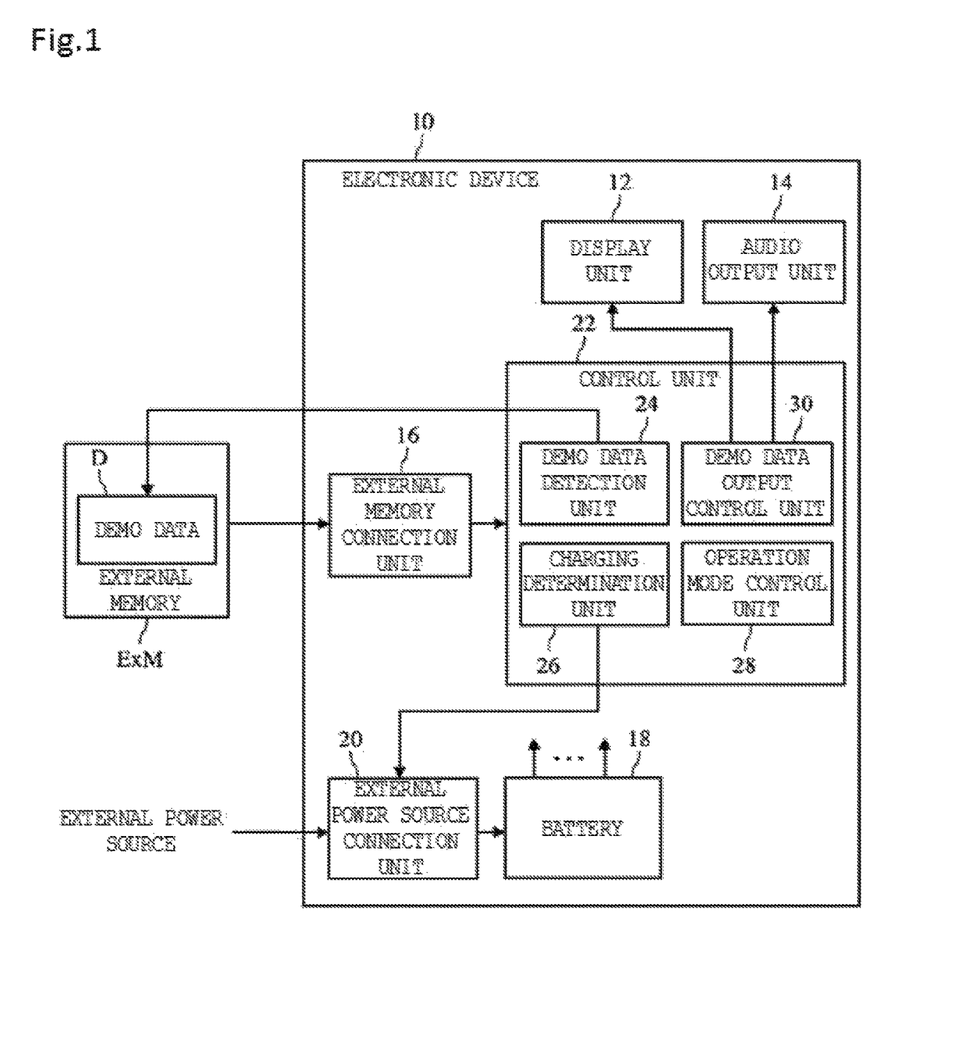
FIG. 1 is a schematic configuration diagram of an electronic device according to an embodiment.

FIG. 1 illustrates a schematic configuration diagram of an electronic device 10 of the present embodiment. Hereinafter, an example where the electronic device 10 is a portable electronic device, more specifically a portable audio player, will be described with reference to the present embodiment, but the electronic device 10 is not limited to such a device. For example, the electronic device 10 may be a stationary device (e.g., an AV amplifier or a stationary audio player).

A storage unit (not shown in FIG. 1) of the electronic device 10 stores (installs) software for switching an operation mode of the electronic device 10 between a demonstration (hereinafter referred to as "demo") mode and a normal mode. Such software is mass-produced software, the software being used not only upon normal use by a user but also upon exhibition at an exhibition location such as a store. The normal mode is the operation mode upon normal use of the electronic device 10 by the user. The demo mode is the operation mode on the assumption of operation at the exhibition location such as the store, operation different from that of the normal mode being performed in the demo mode. For example, in the demo mode of the present embodiment, a reproduced sound quality setting is fixed to the maximum sound quality for the purpose of providing better sound to a customer etc. Moreover, in the demo mode of the present embodiment, demo data (details will be described later) is output in the case of satisfying predetermined conditions.

Moreover, the storage unit of the electronic device 10 stores a program for operating each unit of the electronic device 10. By such a program, the following various functions of the electronic device 10 are fulfilled. Further, such a program may be computer-readable (e.g., readable by the electronic device 10), and may be stored in a non-transitory recording medium.

A display unit 12 as an output unit includes a liquid crystal panel, for example. Various types of information such as information regarding music being reproduced at the electronic device 10, a reproduction volume value, a reproduced sound quality setting, and a reproduction counter are displayed on the display unit 12. Moreover, a user interface used upon operation of the electronic device 10 by the user is displayed on the display unit 12. Further, in a case where the predetermined conditions are satisfied upon operation of the electronic device 10 in the demo mode, image data as the demo data is displayed on the display unit 12 (details will be described later).

An audio output unit 14 includes, for example, a speaker, a speaker drive circuit, and an amplifier circuit. The audio output unit 14 is configured to output, as audio, music targeted for a user's reproduction instruction. Moreover, the audio output unit 14 is configured to output, as audio, audio data as the demo data in a case where the predetermined conditions are satisfied upon operation in the demo mode. That is, the audio output unit 14 can also function as the output unit configured to output the demo data.

An external memory connection unit 16 as an external storage medium connection unit includes, for example, a SD card slot or a USB connector. The external memory connection unit 16 is connected to an external memory ExM as an external storage medium. The external memory ExM stores demo data D. The form of storing the demo data D in the external memory ExM will be described later. In the present embodiment, the demo data D is the image data, but may be the audio data as described above.

A battery 18 is a chargeable secondary battery, and includes a lithium ion battery, for example. The battery 18 is configured to supply power to each unit of the electronic device 10.

An external power source connection unit 20 includes, for example, a USB connector or a power source connector. The external power source connection unit 20 is for connection with an external power source. For example, the external power source may be a personal computer configured so that power can be supplied from a USB connector or a commercial power source, for example. In a case where the external power source is the commercial power source, an AC adaptor configured to convert commercial power into DC voltage with a predetermined voltage is preferably provided between the commercial power source and the external power source connection unit 20.

A control unit 22 includes, for example, a central processing unit (CPU) or a microcontroller. The control unit 22 is configured to control each unit of the electronic device 10 according to the program stored in the storage unit of the electronic device 10. Moreover, as illustrated in FIG. 1, the control unit 22 also functions as a demo data detection unit 24 as a detection unit, a charging determination unit 26, an operation mode control unit 28, and a demo data output control unit 30 as an output control unit. Each function of the control unit 22 will be described below.

The demo data detection unit 24 is configured to detect whether or not the demo data D is stored in the external memory ExM connected to the external memory connection unit 16. The method for detecting the demo data D by the demo data detection unit 24 in the present embodiment is as follows.

First, the demo data detection unit 24 detects whether or not the external memory ExM is connected to the external memory connection unit 16.

In a case where the external memory ExM is connected to the external memory connection unit 16, the demo data detection unit 24 subsequently detects whether or not a demo folder as a specific folder in which the demo data D needs to be stored is present in the external memory ExM (hereinafter merely referred to as an "external memory ExM") connected to the external memory connection unit 16. In the present embodiment, a folder with a preset folder name is detected as the demo data. The preset folder name may be defined in the mass-produced software, and may be stored in the storage unit of the electronic device 10. In the present embodiment, a folder name of "Demo_folder" is defined. That is, in the present embodiment, in a case where a folder with the folder name of "Demo_folder" is present in the external memory ExM, the demo data detection unit 24 detects such a folder as the demo folder. Alternatively, the demo data detection unit 24 may detect, as the demo folder, a folder having a folder name with a preset name. For example, in a case where the preset name is "Demo_folder," the demo data detection unit 24 may detect, as the demo folder, a folder with a folder name such as "Demo_folder_No 1." On the other hand, in a case where no demo folder is detected in the external memory ExM, the demo data detection unit 24 determines that no demo data D is stored in the external memory ExM.

In a case where the demo folder is detected in the external memory ExM, the demo data detection unit 24 further determines whether or not the image data (an image file) is present in the detected demo folder. Then, in a case where the image file is present in the demo folder, the demo data detection unit 24 detects such an image file as the demo data D. That is, it is determined that the demo data D is stored in the external memory ExM. On the other hand, in a case where no image file is detected in the detected demo folder, the demo data detection unit 24 determines that no demo data D is stored in the external memory ExM.

Note that the method for detecting the demo data D as described above has been set forth as an example, and the demo data detection unit 24 may detect, by other methods than above, whether or not the demo data D is stored in the external memory ExM.

For example, regardless of a folder configuration of the external memory ExM, the demo data detection unit 24 may detect, as the demo data D, the file with the preset file name or the file having the file name with the preset name from the external memory ExM. Alternatively, a volume label of the external memory ExM may be detected, and the demo folder (or the demo data D) may be detected considering the detected volume label.

As another alternative, the demo data detection unit 24 may detect, as the demo data D, a file with a preset extension from the external memory ExM.

Although the demo data detection unit 24 detects the demo folder based only on the folder name in the present embodiment, a folder path may be set in advance, and a folder with the preset folder path may be detected as the demo folder in a case where such a folder is present in the external memory ExM. For example, in a case where a folder path of "D:¥Demo¥Gazo_folder" is set as the folder path in advance, e.g., a folder with a folder path of "D:¥ Gazo_folder" is not detected as the demo folder, but a folder with the folder path of "D:¥Demo¥Gazo_folder" may be detected as the demo folder.

The charging determination unit 26 is configured to determine whether or not the battery 18 is being charged. In the present embodiment, the charging determination unit 26 determines, based on whether or not the external power source is connected to the external power source connection unit 20, whether or not the battery 18 is being charged. However, determination on whether or not the battery 18 is being charged may be made by other methods. For example, the charging determination unit 26 may detect a change in the state of charge (SOC) of the battery 18, thereby determining whether or not the battery 18 is being charged.

The operation mode control unit 28 is configured to perform, according to a detection result of the demo data detection unit 24, the control of switching the operation mode of the electronic device 10 between the demo mode and the normal mode. Specifically, in a case where the demo data detection unit 24 detects the demo data D in the external memory ExM, i.e., a case where it is determined that the demo data D is stored in the external memory ExM, the operation mode control unit 28 causes the electronic device 10 to operate in the demo mode. On the other hand, in a case where the demo data detection unit 24 determines that the external memory ExM is not connected to the external memory connection unit 16 and that no demo data D is stored in the external memory ExM, the operation mode control unit 28 causes the electronic device 10 to operate in the normal mode.

Preferably, in a case where the demo data detection unit 24 determines that the demo data D is stored in the external memory ExM and the charging determination unit 26 determines that the battery 18 is being charged, the operation mode control unit 28 may cause the electronic device 10 to operate in the demo mode. That is, even when the demo data D is stored in the external memory ExM, if the battery 18 is not being charged, the operation mode control unit 28 does not bring the electronic device 10 into the demo mode, i.e., may cause the electronic device 10 to operate in the normal mode.

The demo data output control unit 30 is configured to cause the display unit 12 to output the demo data D stored in the external memory ExM in a case where the electronic device 10 operates in the demo mode. That is, the contents of the demo data D as the image file are displayed on the display unit 12. As described above, the demo data D may be an audio file. In this case, the demo data output control unit 30 causes the audio output unit 14 to output, as audio, the contents of the demo data D as the audio file.

Alternatively, the demo data output control unit 30 may determine the output form of the demo data D based on at least part of the data name (the file name) of the demo data D stored in the external memory ExM. The output form is a concept including, for example, the output time of each piece of demo data D, the output order of multiple pieces of demo data D in a case where the multiple pieces of demo data D are stored in the demo folder, display luminance in a case where the demo data D is the image file, and an output sound volume in a case where the demo data D is the audio file.

Figure 2:
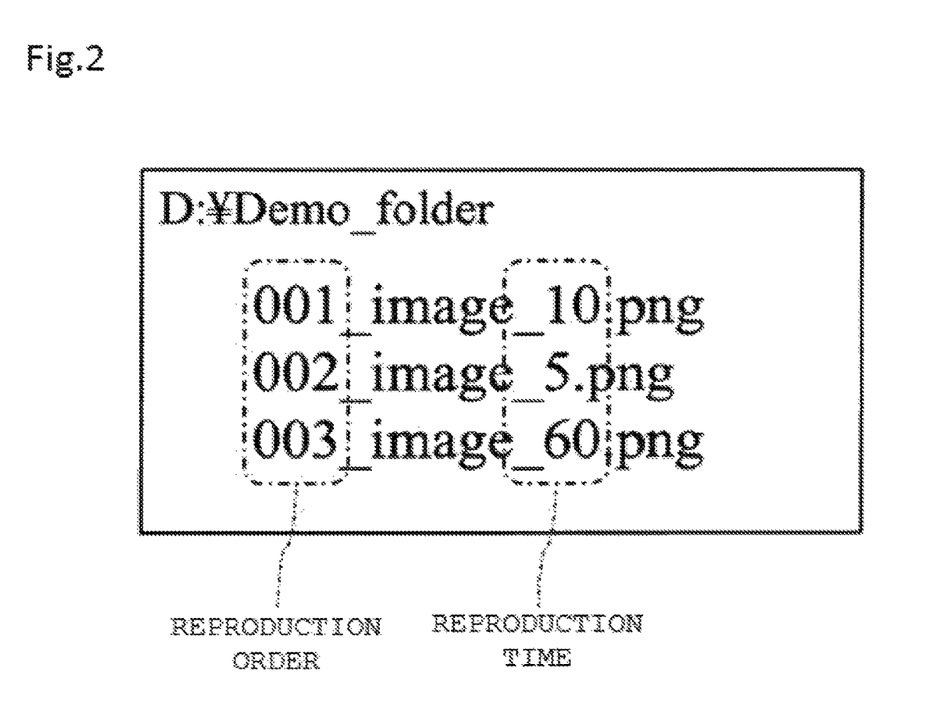
FIG. 2 is a view of an external memory folder name and a demo data folder name according to the embodiment.

In the present embodiment, in a case where the multiple pieces of demo data D are stored in the demo folder, the demo data output control unit 30 determines the display order of each piece of demo data D based on at least part of the file name of each piece of demo data D. In the present embodiment, the demo data output control unit 30 displays each piece of demo data D in ascending order of the file name of each piece of demo data D. That is, the display order of each piece of demo data D is determined based on several characters from the first character of the file name of each piece of demo data D. As illustrated in FIG. 2, a character string such as "001," "002," or "003" is assigned to the first character of the file name of each piece of demo data D stored in the demo folder in the present embodiment, and such a character string portion indicates the display order of each piece of demo data D. Note that in the present specification, the characters are a concept including numerical characters.

Moreover, in the present embodiment, the demo data output control unit 30 determines the display time of the demo data D based on characters extracted from the file name of the demo data D under predetermined conditions. In the present embodiment, the demo data output control unit 30 extracts numerical characters following "_ (an underscore)" from the demo data D, and such demo data D is displayed for seconds corresponding to the extracted numerical characters. For example, in a case where the file name of the demo data D is "001_image$_{10}$.png," numerical characters of "10" are extracted from the file name of "001_image$_{10}$.png." As a result, the display time of such demo data D is determined as 10 seconds. Note that the characters indicating the display time of the demo data D is not limited to the numerical characters. For example, a correspondence such as 10 seconds for "AAA" or 20 seconds for "BBB" may be defined in advance, and the demo data D may be displayed for 10 seconds when "AAA" is extracted from the file name of the demo data D.

In the present embodiment, the display order and the display time of each piece of demo data D are determined as described above. Thus, in a case where three pieces of demo data with file names illustrated in FIG. 2 are, for example, stored in the demo folder, the demo data output control unit 30 may first display "001_image$_{10}$.png" for 10 seconds, subsequently display "002_image$_{5}$.png" for five seconds, and further display "003_image$_{60}$.png" for 60 seconds. Subsequently, the demo data output control unit 30 may again perform displaying starting from "001_image$_{10}$.png" (i.e., three pieces of demo data D are displayed in a loop).

In a case where the electronic device 10 operates in the demo mode and there is no operation for the electronic device 10 for a predetermined time, i.e., the predetermined time has elapsed after recent operation of the electronic device 10, the demo data output control unit 30 causes the display unit 12 to display the demo data D in the external memory ExM. In other words, even in a case where the electronic device 10 operates in the demo mode, the demo data D is not displayed on the display unit 12 while test operation of the exhibited electronic device 10 is being performed by the customer etc., for example. In this case, a screen corresponding to test operation by the customer etc. is displayed on the display unit 12.

The configuration of the electronic device 10 of the present embodiment has been described above. The electronic device 10 in the present embodiment operates in the demo mode in a case where the demo data D is detected in the external memory ExM, and operates in the normal mode in a case where the external memory ExM is not connected and no demo data D is detected in the external memory ExM. That is, the electronic device 10 normally operates in the normal mode, but takes, as a trigger, the demo data D stored in the external memory ExM to operate in the demo mode. Thus, it is not necessary to separately prepare software only for the demo mode and software only for the normal mode, the electronic device 10 is switchable between the demo mode and the normal mode by simple operation.

Specifically, an exhibitor can operate the electronic device 10 in the demo mode at the exhibition location such as the store in such a manner that the external memory ExM storing the demo data D in the demo folder is merely connected to the electronic device 10. The electronic device 10 is handed over to the user in a state in which the external memory ExM storing the demo data D is removed. Thus, it is not necessary to rewrite (modify) the software, and the electronic device 10 operates in the normal mode upon normal use by the user. As long as at least the name of the demo folder is hidden from the user, the electronic device 10 rarely operates in the demo mode upon normal use by the user. Considering reduction in the probability of bringing the electronic device 10 into the demo mode upon normal use by the user, the folder name of the demo folder is preferably a complicated (e.g., a long meaningless character string) name not normally used by the user for avoiding accidental coincidence between a folder name produced in the external memory by the user and the name of the demo folder.

The demo data detection unit 24 detects not only the folder name, but also detects, considering the folder path, the demo folder. This also can further reduce the probability of bringing the electronic device 10 into the demo mode upon normal use by the user. That is, even when a folder with the same folder name as that of the demo folder is accidentally present in the external memory and the image data happens to be in such a folder, the electronic device 10 does not operate in the demo mode upon normal use by the user as long as the folder path of this folder does not match the preset folder path.

Since the electronic device 10 of the present embodiment is the portable audio player configured to reproduce a music file, it is assumed that the user does not often connect the external memory storing the image file to the electronic device 10 upon normal use. Thus, the image data is set as the demo data D for the electronic device 10 as the audio player, and therefore, the probability of bringing the electronic device 10 into the demo mode upon normal use by the user can be further reduced.

In a case where the demo data D is stored in the external memory ExM and the battery 18 is being charged, the electronic device 10 operates in the demo mode so that the probability of brining the electronic device 10 into the demo mode during normal use by the user can be further reduced. That is, in this case, the demo mode is not brought as long as the electronic device 10 is not being charged. At the exhibition location, the electronic device 10 is generally exhibited in a charged state. On the other hand, when the electronic device 10 is the portable electronic device, it is assumed that in many cases, the electronic device 10 is not being charged upon normal use by the user. In view of above, it can be said that operation in the demo mode only when the electronic device 10 is being charged is an effective technique for preventing the electronic device 10 from operating in the demo mode upon normal use by the user in a state in which the electronic device 10 is operable in the demo mode at the exhibition location.

According to the present embodiment, an optional image file stored in the demo folder of the external memory ExM is detected as the demo data D, and is displayed in the demo mode. That is, the exhibitor can optionally select the image file to be displayed in the demo mode. In a case where the software only for the demo mode is prepared and the image to be displayed in the demo mode is defined in a fixed manner by this software, it is assumed that the exhibitor of the electronic device 10 cannot select the image to be displayed in the demo mode by the exhibitor oneself as long as the software is not rewritten. On this point, according to the present embodiment, the exhibitor stores the optional image file in the demo folder of the external memory ExM and connects the external memory ExM to the electronic device 10 so that the optional image file can be displayed in the demo mode. In a case where the exhibitor wishes to display another image file, the image file in the demo folder of the external memory ExM is merely changed. Further, the file name of the image file as the demo data D is optionally set as described above so that the exhibitor can optionally set even the output form such as the display order of each image file in the demo mode and the display time of each piece of image data.

In the present embodiment, the demo data D is displayed in a case where the electronic device 10 operates in the demo mode and there is no operation for the electronic device 10 for the predetermined time. That is, at the exhibition location, no demo data D is displayed while the customer etc. is performing test operation of the electronic device 10. In this case, the screen corresponding to such test operation is displayed on the display unit 12. With this configuration, the displayed demo data D does not interfere with test operation by the customer etc.

Figure 3:
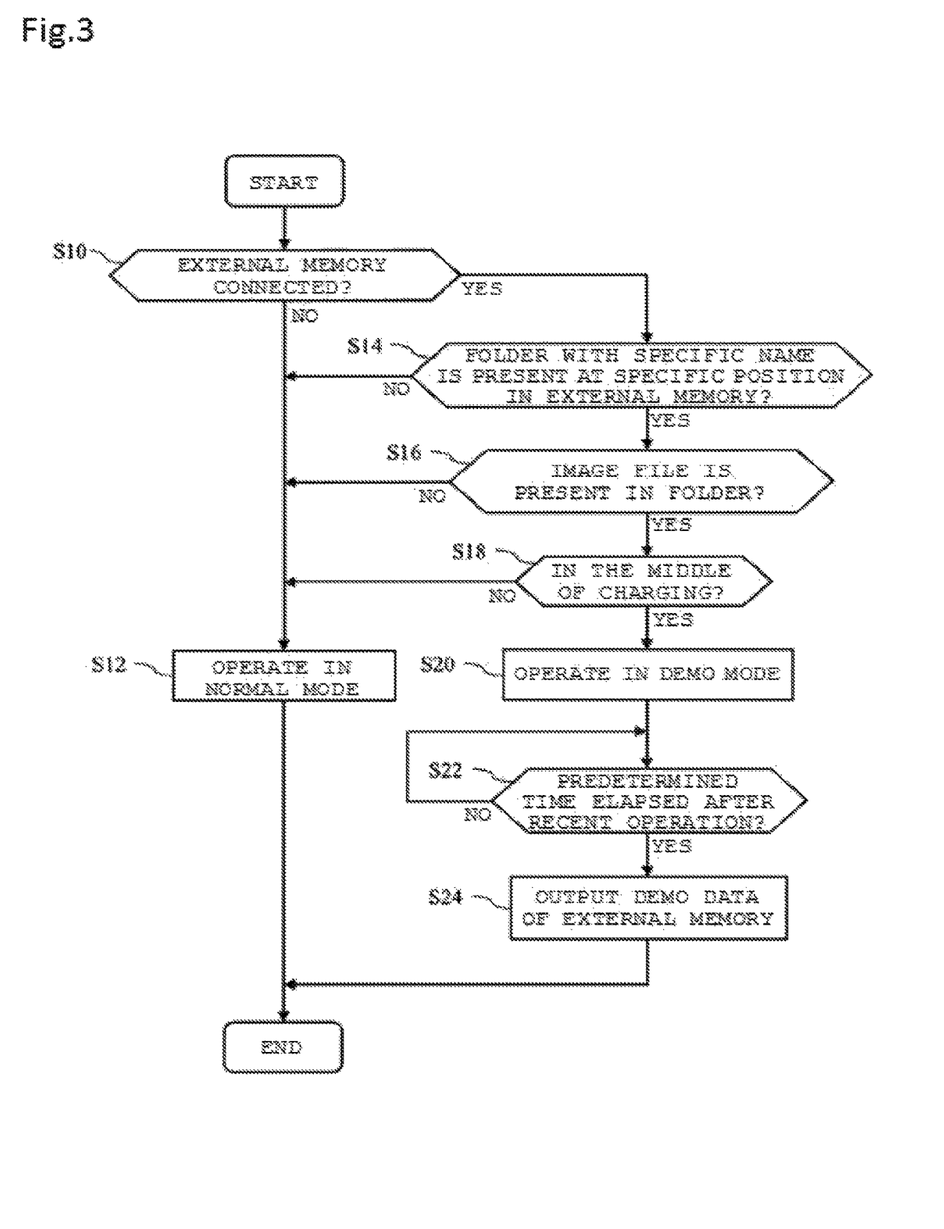
FIG. 3 is a flowchart of the flow of processing of the electronic device according to the embodiment.

Hereinafter, the flow of processing of the electronic device 10 according to the present embodiment will be described with reference to a flowchart shown in FIG. 3.

At a step S10, the demo data detection unit 24 detects whether or not the external memory ExM is connected to the external memory connection unit 16. In a case where it is, at the step S10, determined that the external memory ExM is not connected, the processing proceeds to a step S12. At the step S12, the operation mode control unit 28 causes the electronic device 10 to operate in the normal mode. In a case where it is, at the step S10, determined that the external memory ExM is connected, the processing proceeds to a step S14.

At the step S14, the demo data detection unit 24 determines whether or not a demo folder with a specific name is at a specific position in the external memory ExM. For example, the demo data detection unit 24 determines whether or not a demo folder having a folder path (including a folder name) of "D:¥Demo¥Gazo_folder" is present in the external memory ExM. In a case where the demo folder is not present, the processing proceeds to the step S12. At the step S12, the operation mode control unit 28 causes the electronic device 10 to operate in the normal mode. In a case where the demo folder is present, the processing proceeds to a step S16.

At the step S16, the demo data detection unit 24 determines whether or not an image file is present in the demo folder detected at the step S14. In a case where no image file is present in the demo folder, the processing proceeds to the step S12. At the step S12, the operation mode control unit 28 causes the electronic device 10 to operate in the normal mode. In a case where the image file is present in the demo folder, the processing proceeds to a step S18. Note that the steps S10, S14, and S16 in the present flowchart correspond to a detection step.

At the step S18, the charging determination unit 26 determines whether or not the battery 18 is being charged. In a case where the battery 18 is not being charged, the processing proceeds to the step S12. At the step S12, the operation mode control unit 28 causes the electronic device 10 to operate in the normal mode. In a case where the battery 18 is being charged, the processing proceeds to a step S20.

At the step S20, the operation mode control unit 28 causes the electronic device 10 to operate in the demo mode. As described above, the demo mode is the operation mode for performing operation different from that of the normal mode. For example, the reproduced sound quality setting is fixed to the maximum sound quality, and demo data is displayed by the processing of steps S22 to S24 below. Note that the steps S12 and S20 of the present flowchart correspond to an operation mode control step.

At the step S22, the demo data output control unit 30 determines whether or not the predetermined time has been elapsed after recent operation of the electronic device 10. In a case where the predetermined time has not been elapsed yet after recent operation of the electronic device 10, determination at the step S22 is performed again. The demo data output control unit 30 intermittently performs determination at the step S22 until the predetermined time is elapsed after recent operation. In a case where the predetermined time has been elapsed after recent operation of the electronic device 10, the processing proceeds to the step S24.

At the step S24, the demo data output control unit 30 causes the display unit 12 to display the image file as the demo data stored in the demo folder in the external memory ExM. In this state, the display order and the display time of the image file are, as described above, determined based on the file name of the image file.

The embodiment of the present disclosure has been described above, but the present disclosure is not limited to the above-described embodiment. Various changes can be made without departing form the gist of the present disclosure.

The invention claimed is:

1. An electronic device, comprising:
   an external storage medium connector to which an external storage medium is connected; and
   processing circuitry configured to
      determine whether or not demonstration data is stored in the external storage medium connected to the external storage medium connector;
      cause the electronic device to operate in a demonstration mode in response to determining the demonstration data is stored in the external storage medium connected to the external storage medium connector; and
   cause the electronic device to operate in a normal anode in response to determining the external storage medium is not connected to the external storage medium connector, and in response to determining no demonstration data is stored in the external storage medium connected to the external storage medium connector, wherein
   the processing circuitry is configured to determine an output form of the demonstration data based on at least part of a data name of the demonstration data.

2. The electronic device according to claim 1, wherein the demonstration data stored in the external storage medium includes multiple pieces of demonstration data, and the processing circuitry is configured to determine an output order of each piece of demonstration data based on at least part of a data name of each piece of demonstration data.

3. The electronic device according to claim 1, wherein the processing circuitry is configured to determine an output time of the demonstration data based on a character extracted from the data name of the demonstration data under a predetermined condition.

4. An electronic device, comprising:
an external storage medium connector to which an external storage medium is connected; and
processing circuitry configured to
   determine whether or not demonstration data is stored in the external storage medium connected to the external storage medium connector;
   cause the electronic device to operate in a demonstration mode in response to determining the demonstration data is stored in the external storage medium connected to the external storage medium connector; and
   cause the electronic device to operate in a normal mode in response to determining the external storage medium is not connected to the external storage medium connector, and in response to determining no demonstration data is stored in the external storage medium connected to the external storage medium connector, wherein
the processing circuitry is configured to output the demonstration data stored in the external storage medium in response to determining the electronic device operates in the demonstration mode, and
the processing circuitry is configured to allow output of the demonstration data in a case where the electronic device operates in the demonstration mode and there is no operation for the electronic device for a predetermined time.

5. An electronic device, comprising:
an external storage medium connector to which an external storage medium is connected; and
processing circuitry configured to
   determine whether or not demonstration data is stored in the external storage medium connected to the external storage medium connector;
   cause the electronic device o operate in a demonstration mode in response to determining the demonstration data is stored in the external storage medium connected to the external storage medium connector; and
   cause the electronic device to operate in a normal mode in response to determining the external storage medium is not connected to the external storage medium connector, and in response to determining no demonstration data is stored in the external storage medium connected to the external storage medium connector, wherein
the electronic device further comprising comprises a battery,
the processing circuitry is configured to
   determine whether or not the battery is being charged; and,
   cause the electronic device to operate in the demonstration mode in response to determining that the demonstration data is stored in the external storage medium connected to the external storage medium connector and that the battery is being charted.

6. A method, comprising:
determining, using processing circuitry, whether or not demonstration data is stored in an external storage medium connected to an external storage medium connector of an electronic device;
causing the electronic device to operate in a demonstration mode in response to determining the demonstration data is stored in the external storage medium connected to the external storage medium connector;
causing the electronic device to operate in a normal mode in response to determining the external storage medium is not connected to the external storage medium connector, and in response to determining no demonstration data is stored in the external storage medium connected to the external storage medium connector; and
outputting the demonstration data stored in the external storage medium in response to determining the electronic device operates in the demonstration mode, wherein
the outputting of the demonstration data is allowed in a case where the electronic device operates in the demonstration mode and there is no operation for the electronic device for a predetermined time.

7. A non-transitory computer-readable recording medium including executable instructions, which when executed by a computer cause the computer to execute a method, the method comprising:
determining whether or not demonstration data is stored in the external storage medium connected to an external storage medium connector of an electronic device;
causing the electronic device to operate in a demonstration mode in response to determining the demonstration data is stored in the external storage medium connected to the external storage medium connector;
causing the electronic device to operate in a normal mode in response to determining the external storage medium is not connected to the external storage medium connector, and in response to determining no demonstration data is stored in the external storage medium connected to the external storage medium connector; and
outputting the demonstration data stored in the external storage medium in response to determining the electronic device operates in the demonstration mode, wherein
the outputting of the demonstration data is allowed in a case where the electronic device operates in the demonstration mode and there is no operation for the electronic device for a predetermined time.

8. The electronic device according to claim 1, wherein the processing circuitry is configured to detect, as the demonstration data, data stored in a specific folder in the external storage medium connected to the external storage medium connector.

9. The electronic device according to claim 1, wherein the electronic device is an audio player, and the demonstration data is image data.

10. The electronic device according to claim 4, wherein the processing circuitry is configured to detect, as the demonstration data, data stored in a specific folder in the external storage medium connected to the external storage medium connector.

11. The electronic device according to claim 4, wherein the electronic device is an audio player, and the demonstration data is image data.

12. The electronic device according to claim 5, wherein the processing circuitry is configured to detect, as the demonstration data, data stored in a specific folder in the external storage medium connected to the external storage medium connector.

13. The electronic device according to claim 5, wherein the electronic device is an audio player, and the demonstration data is image data.

14. The electronic device according to claim 5, wherein the processing circuitry is configured to output the demonstration data stored in the external storage medium in response to determining the electronic device operates in the demonstration mode.

* * * * *